May 4, 1965

W. A. BOOTHE 3,181,546

FLUID CONTROL DEVICES

Filed Nov. 8, 1962

INVENTOR:
WILLIS A. BOOTHE,
BY David M. Schiller
ATTORNEY.

May 4, 1965 W. A. BOOTHE 3,181,546
FLUID CONTROL DEVICES
Filed Nov. 8, 1962 3 Sheets-Sheet 3

FIG.6.

INVENTOR:
WILLIS A. BOOTHE,
BY David M. Schiller
ATTORNEY.

3,181,546
FLUID CONTROL DEVICES
Willis A. Boothe, Scotia, N.Y., assignor to General Electric Company, a corporation of New York
Filed Nov. 8, 1962, Ser. No. 236,777
24 Claims. (Cl. 137—81.5)

This invention relates to fluid control devices and has particular relation to digital and analog type fluid amplifiers.

Fluid amplifiers are currently finding wide application in various fields due primarily to their reliability, temperature insensitivity, shock resistance, and ease of fabrication. These devices may be employed as digital and analog computing elements and also as power devices to operate valves and the like. Fluid amplifiers may be operated as pneumatic devices employing a compressible fluid, such as gas or air, or as hydraulic devices utilizing an incompressible fluid, such as water or oil.

Two basic types of fluid amplifiers exist, the first being commonly referred to as the momentum exchange type wherein a main or power fluid jet is deflected by one or more control jets directed laterally at the power jet from opposite sides thereof. The power jet is normally directed midway between two fluid receivers and is deflected relative to the receivers by an amount proportional to the net sideways momentum of the control jets. This device is therefore sometimes referred to as a proportional or analog device.

The second basic type of fluid amplifier is generally known as a boundary layer or Coanda Effect device. In this type power jet deflection is effected by side walls of an interaction chamber which are shaped in such a way that the power jet will attach to one or the other of the side walls but not to both side walls. This is brought about by the entrainment action of the power jet wherein the power jet tends to entrain air trapped between it and an adjacent side wall, the entrainment becoming more effective as the power jet approaches the adjacent side wall. This type of device is basically a two position device and for this reason is generally referred to as a digital device.

Both the analog and digital type of amplifier can be employed not only as logic elements but also as power devices to drive comparatively large loads such as spool type valves and the like which are operatively connected to the fluid receivers. In many applications it is very desirable that provision be made for obtaining high pressure recovery of the power jet to permit effective operation of a load at the output of the device. The term "pressure recovery" as employed herein is the ratio of the pressure differential across the load and the pressure of the power jet.

In certain fluid amplifier applications it is desirable that provision be made for venting fluid from the device to relieve fluid pressure in the receivers resulting from unusual loading conditions. Further, in applications of digital fluid amplifiers it is advantageous to make provision for stabilizing the power jet in a selected one of its two positions so as to provide a true bistable device. Also, in many applications it is desirable that provision be made for effecting rapid switching of the power jet with a minimum of control pressure.

It is therefore an object of the present invention to provide a fluid control device having novel and improved means for effecting a high pressure recovery of the power jet.

It is another object of the invention to provide a fluid control device having a novel and improved venting arrangement for venting excess fluid from the device without impairing pressure recovery.

It is a further object of the invention to provide a digital fluid control device having novel and improved means for increasing the pressure recovery of the power jet and for stabilizing the attachment of the power jet to walls of an interaction chamber.

It is still another object of the invention to provide a digital fluid control device having a novel and improved venting arrangement which is effective both to stabilize the attachment of the power jet to walls of an interaction chamber and to increase the pressure recovery of the power jet, and which also permits provision of a single adjustment for varying the back pressure applied to the chamber.

It is a still further object of the invention to provide a digital fluid control device having novel and improved means for establishing a vortex in the interaction chamber which both stabilizes jet attachment to the chamber walls and increases pressure recovery of the jet.

It is still another object of the invention to provide a digital fluid control device having optimum switching characteristics, pressure recovery of the jet and jet stability.

In carrying out the invention in one form a fluid control device is provided designed primarily for employment as a power device to operate loads such as reciprocable valves. The device of the present invention, however, is also suited for logic applications. The device incorporates means including a nozzle for generating a jet of fluid, such as air or water, which is directed toward two fluid receiving passages leading to a load device, such as a reciprocable valve spool. Control means are provided adjacent the jet nozzle and on opposite sides of the jet emanating therefrom to control deflection of the jet relative to the two fluid-receiving passages. A pair of vent passages are located on opposite sides of the fluid jet adjacent the entrances to the fluid-receiving passages in order to relieve fluid pressure which may build up in the fluid receiving passages. The vent passages in accord with the invention are connected in communication with each other in any suitable manner and are joined to a common vent passage preferably having an adjustable valve associated therewith to permit variation of the fluid vented through the common vent passage.

According to a further aspect of the invention, a digital fluid control device is provided including an interaction chamber having side walls shaped to form boundary layer regions permitting entrainment of fluid adjacent the side walls to effect attachment of the jet to a selected one of the side walls. In the digital device the control means operate to controllably vary fluid pressure adjacent the boundary layer regions to control attachment and detachment of the jet relative to the chamber side walls. A specially configured indentation is provided in accord with the invention in the barrier between the fluid receiving passages which creates a vortex cooperating with specially shaped vent passages to improve considerably pressure recovery and stability of the power jet. The vortex producing indentation is also advantageously combined with the communicating vent passage arrangement to provide very high pressure recovery of the power jet.

A further aspect of the invention contemplates an analog fluid control device including a unique communicating vent passage arrangement wherein a component of the vented fluid is guided to the opposite side of the jet.. According to this aspect of the invention the vented fluid so guided serves to supplement the momentum control of the jet afforded by the control means.

Other objects and advantages of the invention will become apparent from the following description taken in conjunction with the accompanying drawing in which.

Figure 1:
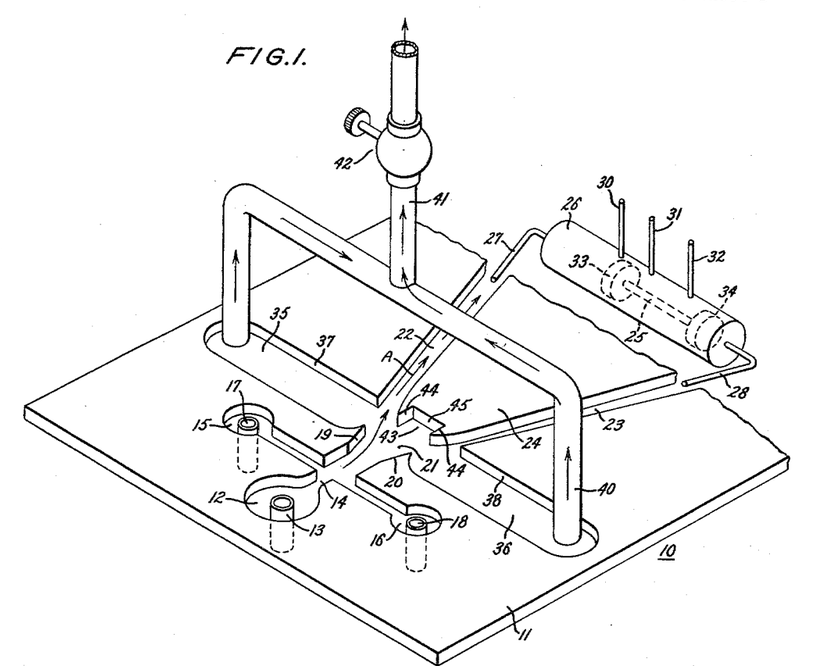
FIG. 1 is a diagrammatic view in perspective illustrating a digital fluid control device constructed according to the invention.

Referring now to the drawings there is illustrated in FIG. 1 one embodiment of the invention in the form of a digital or boundary layer type fluid control device represented generally by the numeral 10. The device 10 is diagrammatically shown in FIG. 1 as including a plate 11 formed of any suitable material, such as metal, plastic or the like, which is slotted in a special configuration to provide passages for fluid. The various slots in the plate 11 may be formed in any suitable manner and may extend entirely through the plate or may be of lesser depth as desired. In the illustrated embodiment, the slots in the plate 11 are shown extending entirely therethrough.

The plate includes a main opening 12 into which extends a conduit or passage 13 which carries pressurized fluid into the opening 12, it being understood that suitable enclosures such as covering plates (not shown) are positioned on opposite sides of the plate 11 to confine fluid to the various slots of the plate 11. The fluid utilized in the control device may assume a variety of forms. For example, the fluid may constitute a compressible fluid, such as air, to provide a pneumatic device. As a further example, the fluid may be incompressible, such as oil or water, to provide a hydraulic device.

Communicating with the opening 12 is a restricted slot 14 constituting a power nozzle from which issues a jet of fluid emanating from the conduit 13. Adjacent the nozzle 14 and on opposite sides of the center line thereof are located a pair of slots 15 and 16 which may be designated control slots and into which extend conduits or passages 17 and 18 for introducing pressurized fluid into the control slots. The conduits 17 and 18 may be supplied with pressurized fluid in any suitable manner, such as from the same source which supplies the conduit 13 or from independent sources as desired. As is understood in the art, pressurized fluid in the control slots 15 and 16 cooperates with boundary layer regions adjacent a pair of diverging side walls 19 and 20 of an interaction chamber 21 to control deflection of the jet issuing from the nozzle 14.

The fluid jet issuing from the nozzle 14 is normally attached to one or the other of the side walls 19 and 20 in the absence of control fluid pressures in the slots 15 and 16. Let it be assumed that the jet is initially attached to the side wall 19. If fluid pressure is introduced into the slot 15 and is increased above a certain value, then the jet will be detached from the wall 19 and will flip into attachment with the side wall 20, the jet remaining in the attached condition even after removal of fluid pressure in the slot 15. To detach the jet from the wall 20 fluid pressure must be introduced into the slot 16 and increased above a certain level at which time the jet will detach from wall 20 and flip to the wall 19. The digital device under discussion is therefore a two position device wherein the main jet is attached to either one of the side walls 19 and 20 but not to both.

In the illustrated embodiment the plate 11 is formed with two elongated diverging fluid receiving passages 22 and 23 which have entrances downstream of the chamber 21 and which selectively receive fluid of the jet depending upon the attached position of the jet. The passages 22 and 23 are separated by a spike or barrier 24 and supply fluid to a suitable load device shown by way of example in the form of a spool valve 25 reciprocable in a cylinder 26 formed in an associated structure (not shown) and connected at its ends in communication with the passages 22 and 23 through conduits 27 and 28. In the embodiment shown the cylinder 26 is in communication with a plurality of conduits 30, 31 and 32 which respectively constitute exhaust, output, and supply conduits.

Figure 2:
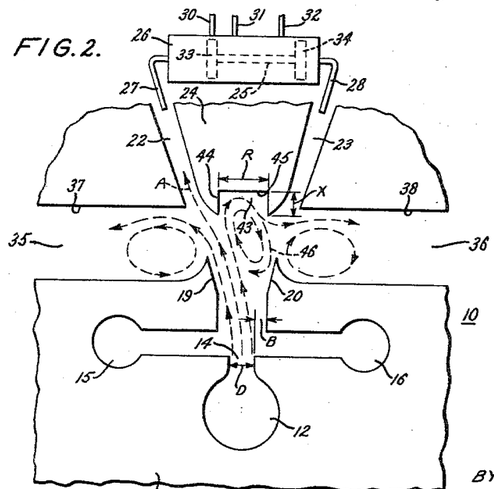
FIG. 2 is a diagrammatic view in top plan of the device of FIG. 1 with parts removed showing in particular the configuration and action of the indented barrier between the load passages.

In FIGS. 1 and 2 the valve 25 is illustrated in its right hand position wherein the lands 33 and 34 thereof respectively cover the opening (not shown) of the exhaust conduit 30 and uncover the opening (not shown) of the supply conduit 32 whereby working fluid from the supply conduit 32 can pass through the cylinder and out the output conduit 31 to operate any suitable fluid operated device. This condition is established when the power jet emanating from the nozzle 14 is attached to the side wall 19 and is directed into the load passage 22 as indicated by the arrows A, and from there through the connection 27 into the left-hand end of the cylinder 26. When the jet of fluid is flipped into attachment with the wall 20 by introducing fluid pressure into the control slot 15, the fluid of the jet will be directed through the load passage 23 and through the connection 28 into the right-hand end of the cylinder 26 to displace the valve 25 from its illustrated position toward the left to a position wherein the lands 33 and 34 respectively uncover the exhaust conduit 30 and cover the supply conduit 32. For this condition fluid is prevented from entering the cylinder 26 from the supply conduit 32. Spool valve types other than that illustrated, such as four-way valves, can be activated by the fluid control device of the present invention.

It is desirable that provision be made for venting fluid from the device to relieve fluid pressure which may build up in the load passages. For this purpose the plate 11 includes a pair of vent passages 35 and 36 located on the opposite sides of the center line of the nozzle adjacent the entrances to the load passages 22 and 23. The vent passages 35 and 36 in the embodiment of FIGS. 1 and 2 have straight horizontally extending side walls 37 and 38 as viewed in FIG. 2 which are located slightly downstream from the tip of the barrier 24.

In accord with the present invention the vent passages 35 and 36 are connected in communication with each other, and in the illustrated embodiment the outer ends of the vent passages 35 and 36 receive open ends of passage means comprising U-shaped tubing 40 which is connected at its base to a common vent tube 41 which conducts the vented fluid either to atmosphere or back to the pressure fluid supply as desired. It is appreciated that other means may be utilized to connect the passages 35 and 36 in communication with each other and that the particular tubing 40 is illustrated by way of example only.

Placing the vent passages 35 and 36 in communication with each other produces very desirable results. To illustrate this let it be assumed that the jet is attached to the wall 19 and that fluid is entering the load passage 22 as shown by the arrows A. If the load device cannot accept the fluid flow, then the excess will spill out into the vent passages 35 and 36, the major portion of the excess entering passage 35 for the assumed condition. The fluid so vented passes through the conduit 40 and joins at the junction point to pass out through the conduit 41. The flow through the passage 35 is greater than that through passage 36 and it may be shown that the fluid pressure in passage 36 is greater than that in passage 35. The fluid pressure so resulting in passage 36 not only operates to stabilize the jet against wall 19 but additionally operates to compress the jet to provide an increase in pressure recovery over that obtainable without the communicating vent arrangement. The flow stabilizing effect of the fluid pressure in passage 36 permits the provision of walls 19 and 20 having shorter longitudinal dimensions than heretofore practical. This permits the location of the load passages 22 and 23 closer to the power nozzle 14 than in previous designs which results in a still further increase in pressure recovery and which provides a device of very small dimensions.

An additional very desirable feature resulting from the communicating vent passage arrangement is that it permits provision of a single adjustment for varying the back pressure applied to the chamber 21. For this purpose a valve 42 is associated with the conduit 41 to permit adjustment of the restriction presented to fluid vented through conduit 41 and thereby adjustment of the back pressure applied to the chamber 21.

An additional flow stabilizing and pressure recovery booster arrangement is provided in accord with the invention and is advantageously employed in cooperation with the communicating vent passage arrangement to afford an extremely efficient and compact digital fluid control device. This additional arrangement involves the establishment of a so-called latching vortex of a portion of the fluid of the jet, the vortex acting both to stabilize jet attachment and to increase the pressure recovery of the jet. In FIGS. 1 and 2 the latching vortex is created by means of an indentation 43 in the face of barrier 24 which confronts the power nozzle 14.

In the embodiment of FIGS. 1 and 2 the indentation 43 is positioned symmetrically with respect to the central axis of the nozzle 14 and is of rectangular configuration with parallel spaced short side walls 44 connected by a transversely extending rear wall 45. The indentation receives a portion only of fluid from the attached jet and the effect of the indentation 43 is to establish a vortex flow in the direction indicated by the arrows 46 in FIG. 2 which operates to compress the main jet against the side wall to which it is attached, the side wall 19 in FIG. 2, resulting in both improved jet stability and an appreciable increase in the pressure recovery over that obtainable without the indentation 43.

Good results have been obtained with devices having the configuration of the device shown in FIG. 2 and in which the indentation 43 has a depth dimension X which is at least equal to the width dimension D of the nozzle 14, and has a width dimension R which is equal to substantially twice the width dimension of the nozzle 14. It has been demonstrated by tests that pressure recovery decreases when the depth dimension X of the indentation 43 is decreased to values less than the dimension D of nozzle 14. Also, the strength of the latching vortex produced by the indentation 43 is substantially proportional to the width dimension R of the indentation within limits inasmuch as a greater amount of fluid of the jet is intercepted by the indentation as the dimension R is increased. However, as the dimension R of the indentation is increased, greater control flows from the control slots 15 and 16 are required to detach the jet from the side wall to which it is attached. Therefore, the width dimension R of the indentation should be selected to be sufficiently large to assure jet stability and to provide a substantial pressure recovery, and yet should be sufficiently small so that excessively large control flows from the control slots 15 and 16 are not required to effect jet detachment.

Figure 3:
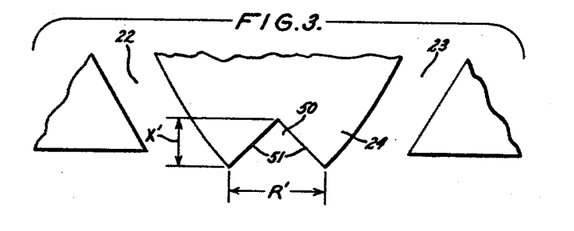
FIG. 3 is a fragmentary view showing a different configuration of the indentation of the barrier of FIG. 2.

FIG. 3 illustrates a different embodiment of the invention wherein the device of FIGS. 1 and 2 is provided with an indentation 50 of the barrier 24 having a different configuration than the indentation 43 previously described. The indentation 50 of FIG. 3 is of triangular configuration having side walls 51 which intersect at right angles in a line which is intersected by the central axis of the nozzle 14 (not shown in FIG. 3). Good results have been obtained by forming the indentation 50 with a depth dimension X' at least equal to the width dimension D of the nozzle 14, and with a width dimension R' of greatest extent which is approximately twice the width dimension D of the nozzle 14.

Figure 4:
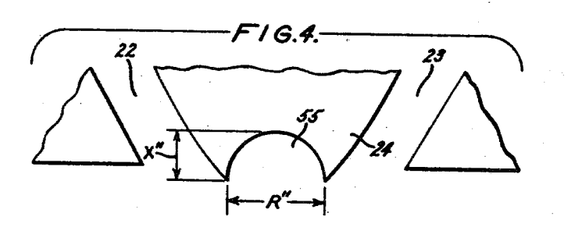
FIG. 4 is a fragmentary view showing still another configuration of the barrier of FIG. 2.

FIG. 4 illustrates still another embodiment of the invention wherein the device of FIGS. 1 and 2 is provided with an indentation 55 of different configuration than the indentations 43 and 50 of FIGS. 2 and 3. As shown in FIG. 4, the indentation 55 is of semi-circular configuration, the depth or a radius X" of the indentation 55 being equal to approximately the width dimension D of the nozzle 14 (not shown in FIG. 4), and the width dimension or diameter R" of the indentation 55 being equal to approximately twice the width dimension D of the nozzle 14. The indentation 55 is positioned symmetrically relative to the central axis of the nozzle 14 (not shown in FIG. 4).

While three differently configured notches 43, 50 and 55 have been illustrated and described in connection with the device of FIGS. 1 and 2, it can be appreciated that the configuration and dimensions of the vortex producing notch will depend in large part on the configuration and dimensions of the various portions of the control device in which the notch is employed.

Figure 6:
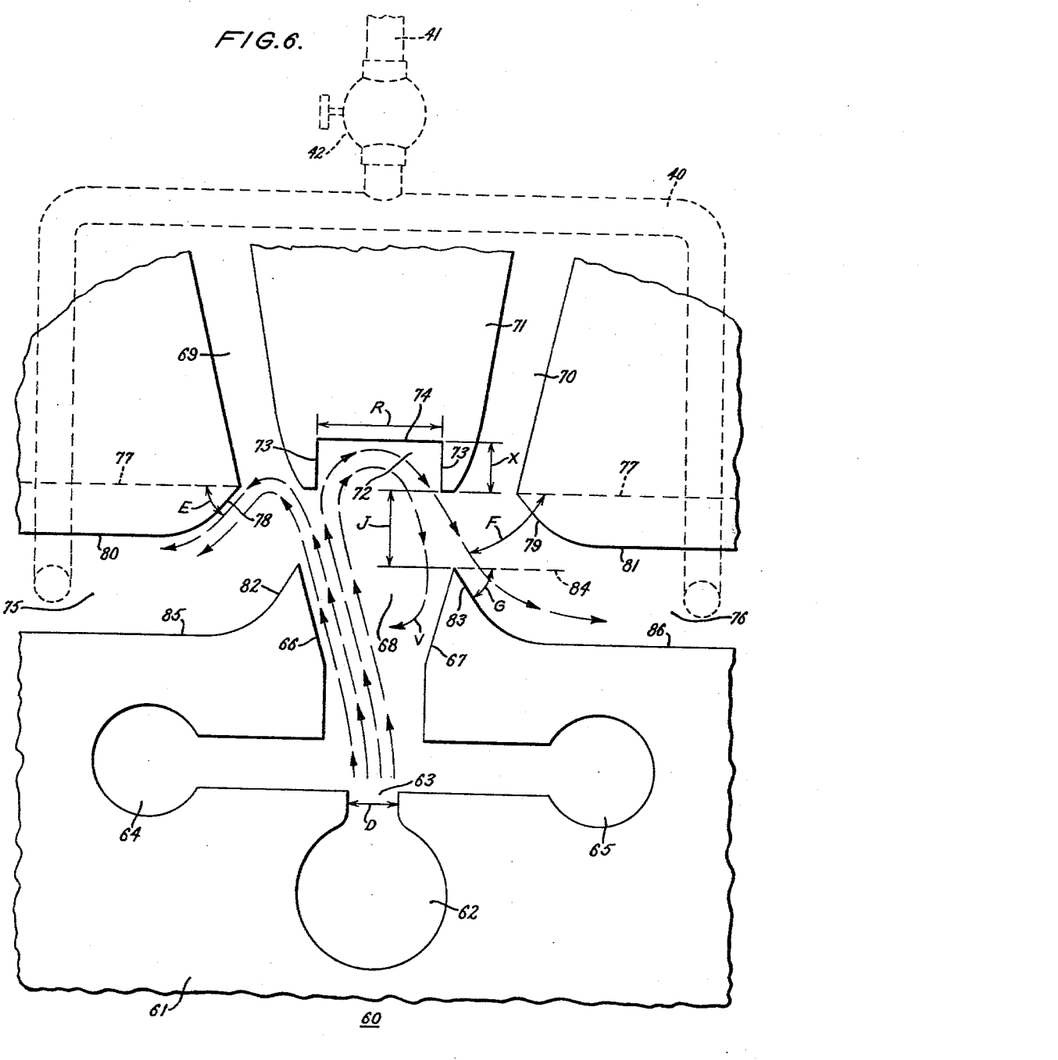
FIG. 6 is a diagrammatic view in top plan illustrating a digital fluid control device of different configuration than the device of FIGS. 1 and 2.

Still further improvement in pressure recovery of the jet, jet stability, and switching characteristics may be realized in a fluid control device having the configuration illustrated in FIG. 6. Pressure recovery of the order of seventy five percent has been achieved by the device of FIG. 6 and as will presently appear, the improved performance characteristics of the device of FIG. 6 is realized by proper selection of the configurations and dimensions of the vent passages and the vortex producing notch, as well as by proper relative positioning of the vent passages and the notch.

Referring now to FIG. 6, there is illustrated a fluid control device 60 of the digital or boundary layer type including a plate 61 having an opening 62 adapted to receive a conduit (not shown) to carry pressurized fluid into the opening 62. Communicating with the opening 62 is a restricted slot 63 constituting a power nozzle from which issues a jet of fluid. Adjacent the nozzle 63 and on opposite sides of the center line thereof are located a pair of control slots 64 and 65 adapted to receive conduits (not shown) for introducing pressurized fluid into the slots 64 and 65. Pressurized fluid in the control slots 64 and 65 cooperates with boundary layer regions adjacent a pair of diverging side walls 66 and 67 of an interaction chamber 68 to control deflection of the jet issuing from the nozzle 63.

The plate 61 is also formed with two elongated diverging fluid receiving passages 69 and 70 adapted to selectively receive fluid of the jet depending upon the attached position of the jet. The passages 69 and 70 are separated by a spike or barrier 71 and supply fluid to a suitable load device, such as the spool valve 25 shown in FIG. 1. The face of the barrier 71 which confronts the nozzle 63 is formed with an indentation or notch 72 preferably of rectangular configuration and having spaced parallel side walls 73 connected by a base 74. The purpose of the notch 72 is to establish a latching vortex in the manner previously described in connection with the device of FIGS. 1 and 2. In the device 60 of FIG. 6 the width dimension R of the notch 72 is somewhat larger than the corresponding dimension of the notch 43 in the device 10 of FIG. 2.

The plate 61 is also formed with a pair of vent passages 75 and 76 corresponding to the passages 35 and 36 of the device 10 of FIGS. 1 and 2. It is noted that the vent passages 75 and 76 are of different configuration than the corresponding passages 35 and 36 of the device 10, and that the passages 75 and 76 and the notch 72 occupy different relative positions than the corresponding passages and notch of the device 10. In the device 60 the vent passages 75 and 76 and the notch 72 are configured and are positioned relative to one another to provide very desirable operating characteristics of the device 60.

It will be recalled in the discussion of the embodiment of FIGS. 1 and 2 that for certain operating conditions fluid of the main jet is vented through one or the other of the passages 75 and 76 depending upon the position of attachment of the main jet. In FIG. 6 the jet is shown attached to the side wall 66 and fluid is being vented through the passage 75. Tests have shown that pressure recovery of the jet is substantially proportional to the angle at which the vented fluid enters the selected one of the vent passages, and that such angle is dependent upon the configurations of the vent passages which are more fully described hereinafter. This so-called fluid entering angle is represented in FIG. 6 by the latter E and is taken with reference to the horizontal broken line 77 in FIG. 6.

When the jet is attached to the side wall 66 as shown in FIG. 6, a portion of the fluid of the jet is trapped by the notch 72 and establishes a latching vortex represented by the arrow V which acts to press the jet against the side wall 66. FIG. 6 also shows a portion of the fluid leaving the right hand side of the notch 72 and entering the vent passage 76 without becoming a part of the vortex. Tests have shown that the strength of the vortex, and therefore pressure recovery, jet stability and jet switching characteristics are dependent upon the proportion of fluid which leaves the notch 72 and enters the adjacent one of the vent passages without becoming part of the vortex. In turn, this proportion is dependent upon the angle at which fluid leaves the notch 72 and this so-called fluid leaving angle is represented in FIG. 6 by the letter F taken with reference to the horizontal line 77 in FIG. 6.

Inspection of FIG. 6 reveals that if the angle F is increased, an increasing amount of fluid leaving the notch 72 is diverted into the vortex and a decreasing amount of fluid leaving the notch 72 enters the vent passage 76. This results in increasing the strength of the vortex which increases pressure recovery of the jet and which raises the stability of attachment of the jet to the side wall 66. However, raising jet stability increases the control pressure required in the control passage 64 to detach the jet thereby impairing the jet switching characteristics. If on the other hand the angle F is decreased, an increasing proportion of fluid leaving the notch 72 enters the passage 76 and a decreasing proportion of fluid leaving the notch 72 is diverted into the vortex. Thus, the vortex is weakened with a consequent lessening of the pressure recovery and a lowering of the jet stability. However, the jet switching characteristics are improved as a result of the lowering of the jet stability.

The angle F is dependent upon the configurations of the passages 75 and 76 and of the notch 72 as well as the relative positions of the notch 72 and the passages 75 and 76. This may be explained by consideration of the following assumed dimensional variations. If the depth dimension X of the notch 72 is increased, the angle F is also increased with the result that the vortex is strengthened. Conversely, if the dimension X is decreased, the angle F decreases which thereby weakens the vortex. Increasing the width dimension R of the notch 72 up to a certain value effects a slight decrease in the angle F but also results in more of the fluid of the jet being intercepted by the notch and the overall effect is that the strength of the vortex increases. However, if the dimension R is increased beyond a certain value, the angle F is further decreased and the area at which fluid leaves the notch is shifted to the right in FIG. 6. This causes substantially all of the fluid leaving the notch 72 to enter the passage 76 resulting in establishment of a very weak vortex or no vortex at all. Also, increasing the spacing between the downstream ends of the side walls 66 and 67 and the confronting tip of the barrier 71, the dimension J in FIG. 6, results in less of the fluid of the jet entering the notch 72 thereby weakening the vortex.

In the present invention the configurations and dimensions of the vent passages 75 and 76 and of the notch 72 together with the relative positioning of the passages 75 and 76 and the notch 72 are selected so as to provide optimum pressure recovery of the jet, jet stability, and switching characteristics of the device. For this purpose the passages 75 and 76 are formed with side wall portions 78 and 79 respectively which slope back from the entrances to the passages 69 and 70 at preselected angles which are shown in FIG. 6 to be approximately 45° with reference to the line 77. This arrangement enforces flow of fluid vented into the passages 75 and 76 at entering angles E which are greater than the entering angles in the devices of FIG. 2 and which provide improved pressure recovery of the jet. The points of origin of the side wall portions 78 and 79 are included in the line 77 which is included in the plane of the front surfaces of the barrier 71. The side wall portions 78 and 79 connect with horizontally extending side wall portions 80 and 81 of the passages 75 and 76.

The passages 75 and 76 also include side wall portions 82 and 83 positioned upstream from the side wall portions 78 and 79 and extending from the ends of the side walls 66 and 67 at preselected angles G with reference to a horizontal line 84 which intersects the two lines of intersection of the side walls 66 and 67 and the adjacent side wall portions 82 and 83. It may be shown that variations in the angles G produce changes in the angles E and F, the angles E and F increasing as the angles G are increased. In the embodiment of FIG. 6 the angles G are selected to contribute to the establishment of angles E and F which provide optimum operating characteristics and excellent results have been obtained by providing angles G in the device 60 of approximately 60°. The side wall portions 82 and 83 connect respectively with horizontally extending side wall portions 85 and 86. The ends of the wall portions 82 and 83 at the open ends are spaced by a distance which is less than the distance by which the corresponding ends of the wall portions 78 and 79 are spaced.

The dimensions and location of the notch 72 are also selected to provide optimum operating characteristics and excellent results have been obtained by selecting the dimensions R, X and J of the device 60 to have the following approximate values:

$$R = 2\tfrac{1}{2}D$$
$$X = D$$
$$J = 1\tfrac{1}{2}D$$

The communicating vent arrangement previously described in connection with the digital device of FIGS. 1 and 2 may also be advantageously employed in the device of FIG. 6 to provide further improved operating characteristics. The tubing 40, common vent tube 41 and the valve 42 are shown in dash lines in FIG. 6. Although operation and details of the device 60 have been described with the assumption that the jet is attached to the side wall 66, the device 60 is symmetrical and the description is also applicable for the assumption that the jet is attached to the side wall 67.

Figure 5:
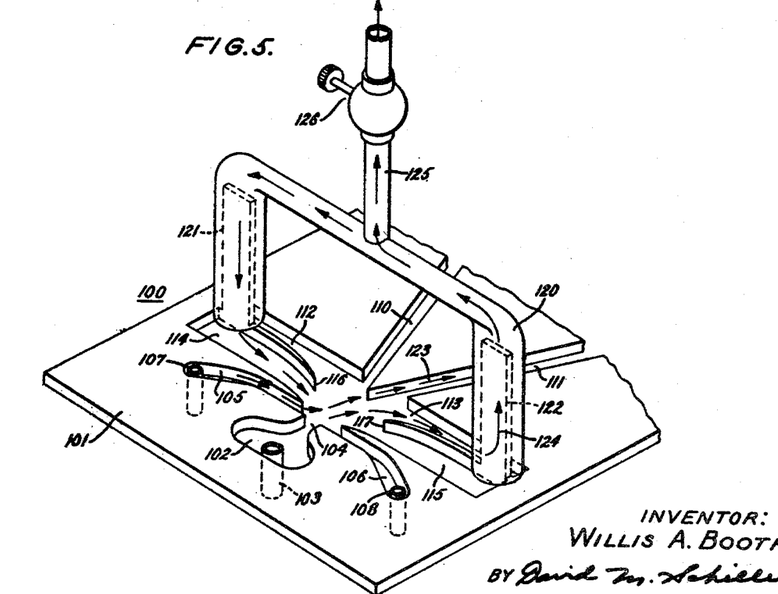
FIG. 5 is a diagrammatic view in perspective showing an analog fluid control device constructed according to the invention.

A communicating vent arrangement similar to that described in connection with the digital device 10 is advantageously employed in an analog fluid control device which is also referred to as a momentum exchange fluid device. In FIG. 5 there is illustrated an analog fluid device represented generally by the numeral 100 and including a plate 101 corresponding to the plate 11 in FIG. 1 and having a plurality of slots configured to provide passages for fluid. The plate 101 includes an opening 102 into which extends a conduit or passage 103 containing pressurized fluid which may comprise either a gas or liquid as described in connection with the device 10 of FIG. 1. Covering plates (not shown) are located on opposite sides of the plate 101 to confine the pressurized fluid to the various passages formed in the plate 101. Fluid under pressure from the conduit 103 passes through a restricted nozzle 104 and issues therefrom as a jet which is normally directed along a path extending along the center line of the nozzle 104. The analog device of FIG. 5 differs primarily from the digital device of FIG. 1 in that the analog device does not incorporate specially shaped side walls corresponding to the walls 19 and 20 of the device of FIG. 1.

In order to control deflection of the jet of fluid issuing from the nozzle 104 means are provided to impart lateral momentum to the jet. For this purpose control slots 105 and 106 are formed in the plate 101 which open at opposing sides of the normal path of travel of the jet and into which extend nozzled conduits or passages 107 and 108 containing pressurized fluid which flows from the slots 105 and 106 at right angles to the normal path of travel of the jet. It may be demonstrated that the tangent of the angle of deflection of the main jet is equal to the ratio of the net lateral momentum of the control jets and the axial momentum of the main jet so that the amount of fluid received by a selected one of two fluid receiving passages 110 and 111 is proportional to the difference in momentum of fluid issuing from the control slots 105 and 106.

The passages 110 and 111 may be connected to a suitable load device, such as the valve 25 of FIG. 1, and in such applications it is desirable that suitable venting means be provided to relieve fluid presure which may build up in the passages 110 and 111. A communicating vent arrangement similar to that in the device of FIG. 1 is employed in the device 100 of FIG. 5 so that fluid pented from one of the load passages is returned to the opposite side of the jet as a control momentum to provide desirable operating characteristics. For this purpose a pair of vent passages 112 and 113 are formed in the plate 101 opening on opposite sides of the normal path of the main jet and adjacent the entrances to the load passages 110 and 111. Auxiliary control slots 114 and 115 are provided which open on opposite sides of the normal path of travel of the main jet adjacent the nozzle 104, the auxiliary slots 114 and 115 being separated from the vent passages 112 and 113 by barriers 116 and 117 which are curved toward the nozzle 104.

The vent passages 112 and 113 are connected in communication in any suitable manner and in the embodiment shown in FIG. 5 a U-shaped conduit 120 is provided for this purpose having two open ends, one of which overlies the rear parts of both of the slots 112 and 114 and the other of which overlies the rear parts of both of the slots 113 and 115. A pair of upstanding projections 121 and 122 are preferably provided on the barriers 116 and 117 respectively to extend upwardly through the open ends of the conduit 120 substantially the entire length of the vertical portions thereof and midway between the side walls thereof.

Assuming that the main jet is deflected into the passage 111 as shown by the arrows 123 in FIG. 5, fluid overflowing out of the passage 111 is directed into the vent passage 113 and through the conduit 120 as indicated by the arrows 124, a first component of the vented fluid being directed through a common vent passage 125 connected to the conduit 120, and a second component of the vented fluid passing through the conduit 120, exiting therefrom at the slot 114, and then issuing from the slot 114 to comprise an auxiliary fluid momentum acting on the main jet at an area adjacent the nozzle 104 to maintain proper deflection of the main jet. The conduit 125 may be provided with a suitable valve 126 to control the amount of fluid vented therethrough.

The device of the present invention can be utilized in logic applications as well as power applications. In logic applications a plurality of fluid control devices may be arranged so that the output of one is connected to the input of another downstream, etc. In such an arrangement when a device downstream is switched, severe changes in back pressure may be produced in the device upstream. It has been observed that devices constructed in accord with the present invention are substantially insensitive to such back pressure changes.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a fluid control device, first means for generating a jet of fluid, fluid receiving means downstream from said first means for receiving fluid from a jet generated by said first means, control means for controllably deflecting a jet generated by said first means relative to said receiving means, a pair of vent passages opening at opposite sides of a jet generated by said first means for relieving fluid pressure in said receiving means, and passage means connecting said vent passages in communication with each other and in communication with a common vent passage.

2. A device as defined in claim 1 including means for adjustably restricting said common vent passage.

3. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, fluid receiving means downstream from said side walls for receiving fluid of an attached jet generated by said first means, control means for controlling attachment of a jet generated by said first means to said side walls, a pair of vent passages opening at opposite sides of a jet generated by said first means for receiving fluid pressure in said receiving means, and passage means connecting said vent passages in communication with each other and in communication with a common vent passage.

4. A device as defined in claim 3 including means for adjustably restricting said common vent passage.

5. A device as defined in claim 3 wherein said vent passages open at areas downstream from said side walls and intermediate the side walls and said receiving means.

6. In a fluid control device, first means for generating a jet of fluid, fluid receiving means downstream from said first means for receiving fluid from a jet generated by said first means, control means at a side of a jet of fluid generated by said first means for producing a control jet of fluid which by momentum exchange controllably deflects a jet of fluid generated by said first means relative to said receiving means, a pair of vent passages opening at opposite sides of a jet of fluid generated by said first means for relieving fluid pressure in said reeiving means, and passage means connecting said vent passages in communication with each other and in communication with a common vent passage.

7. A device as defined in claim 6 including means for adjustably restricting said common vent passage.

8. In a fluid control device, first means for generating a jet of fluid, fluid receiving means downstream from said first means for receiving fluid of a jet generated by said first means, control means at a side of a jet of fluid generated by said first means for producing a control jet of fluid which by momentum exchange controllably deflects a jet of fluid generated by said first means relative to said receiving means, a pair of vent passages opening at opposite sides of a jet of fluid generated by said first means for relieving fluid pressure in said receiving means, second means effective to connect said vent passages in communication with each other and to guide a component of fluid vented through either of said vent passages to the opposite side of and toward a jet of fluid generated by said first means for providing an auxiliary control of jet deflection, and a common vent passage connected to said communicating vent passages.

9. A device as defined in claim 8 wherein said second means includes barriers dividing each vent passage into a pair of side by side sub passages, and tubing having communicating open ends each overlapping the sub passages of a separate pair of sub passages.

10. In a fluid control device, first means including a nozzle having a preselected width dimension for generating a jet of fluid, a chamber downstream from the nozzle having side walls establishing boundary layer regions which effect attachment of a jet generated by said first means to a selected side wall when the jet is deflected toward the selected side wall, fluid-receiving means for receiving fluid from a jet attached to a selected side wall, control means for controlling attachment of a jet generated by said first means to said side walls, and a barrier downstream from said chamber with an end face confronting said chamber, said end face having a rectangular indentation for receiving a portion only of fluid from an attached jet generated by said first means and creating a vortex of the received fluid flowing in a direction to maintain attachment of an attached jet, said indentation having a width dimension at least twice as great as said nozzle width dimension, and having a depth dimension at least as great as said nozzle width dimension.

11. In a fluid control device, first means including a nozzle having a preselected width dimension for generating a jet of fluid, a chamber downstream from the nozzle having side walls establishing boundary layer regions which effect attachment of a jet generated by said first means to a selected side wall when the jet is deflected toward the selected side wall, fluid-receiving means for receiving fluid from a jet attached to a selected side wall, control means for controlling attachment of a jet generated by said first means to said side walls, and a barrier downstream from said chamber with an end face confronting said chamber, said end face having a triangular indentation for receiving a portion only of fluid from an attached jet generated by said first means and creating a vortex of the received fluid flowing in a direction to maintain attachment of an attached jet, said indentation having a pair of right-angled side walls, the depth of said indentation being at least as great as the nozzle width dimension, the width dimension of greatest extent of said indentation being equal to approximately twice the nozzle width dimension.

12. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, fluid receiving means for receiving fluid from a jet attached to a selected side wall, control means for controlling attachment of a jet generated by said first means to said side walls, a barrier downstream from said chamber with an end face confronting said chamber, said end face having an indentation for receiving a portion only of fluid from an attached jet generated by said first means and creating a vortex of the received fluid flowing in a direction to maintain attachment of an attached jet, a pair of vent passages opening at opposite sides of a jet generated by said first means for relieving fluid pressure in said fluid receiving means, passage means connecting said vent passages in communication with each other and in communication with a common vent passage.

13. A device as defined in claim 12 including means for adjustably restricting said common vent passage.

14. A device as defined in claim 12 wherein said first means includes a nozzle having a preselected width dimension, said indentation having a rectangular configuration, said indentation having a width dimension at least twice as great as said nozzle width dimension, and having a depth dimension at least as great as said nozzle width dimension.

15. In a fluid control device, first means including a nozzle having a preselected width dimension for generating a jet of fluid, a chamber downstream from the nozzle having side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, said end face having an indentation for receiving a portion only of fluid from an attached jet generated by said first means and creating a vortex of the received fluid flowing in a direction to maintain attachment of an attached jet, a pair of vent passages opening at opposite sides of a jet generated by said first means and adjacent the entrances to said fluid receiving passages for relieving fluid pressure in said fluid receiving passages, passage means connecting said vent passages in communication with each other and in communication with a common vent passage, said indentation being substantially symmetrically positioned relative to the center line of said nozzle, and having a rectangular configuration with a width dimension which is at least twice as great as the nozzle width, and having a depth at least as great as the nozzle width, and means for adjustably restricting said common vent passage.

16. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, and a pair of vent passages opening at opposite sides of a jet generated by said first means and adjacent the openings of said fluid receiving passages for relieving fluid pressure in said fluid receiving passages, each of said vent passages having a pair of side walls each having a portion at the open end which extends upstream and away from the open end, said end face having an indentation for receiving a portion only of fluid from an attached jet generated by said first means and creating a vortex of a portion of the received fluid flowing in a direction to maintain attachment of an attached jet, said indentation being dimensioned such that a portion of fluid leaving the indentation enters the adjacent vent passage without becoming part of the vortex the ends of the two upstream side wall portions of said vent passages at the open ends being spaced by a distance which is less than the distance by which the corresponding ends of the two downstream side wall portions are spaced.

17. In a fluid control device, first means including a nozzle having a preselected width dimension for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, and a pair of vent passages opening at opposite sides of a jet generated by said first means and adjacent the openings of said fluid receiving passages for relieving fluid pressure in said fluid receiving passages, each of said vent passages having a pair of side walls each having a portion at the open end which extends upstream and away from the open end said end face having an indentation for receiving a portion only of fluid from an attached jet generated by said first means and creating a vortex of a portion of the receiving fluid flowing in a direction to maintain attachment of an attached jet, said indentation being dimensioned such that a portion of fluid leaving the indentation enters the adjacent vent passage without becoming part of the vortex, said indentation having a depth dimension at least as great as said nozzle width dimension, the ends of the two upstream side wall portions of said vent passages at the open ends being spaced by a distance which is less than the distance by which the corresponding ends of the two downstream side wall portions are spaced.

18. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, a pair of vent passages opening at opposite sides of a jet generated by said first means and adjacent the openings of said fluid receiving passages for relieving fluid pressure in said fluid receiving passages, each of said vent passages having a pair of side walls with the downstream side wall of each vent passage having a straight portion at its open end which extends upstream and away from the open end, said end face having an indentation for receiving a portion only of fluid from an attached jet generated by said first means and creating a vortex of the receiving fluid flowing in a direction to maintain attachment of an attached jet, said indentation being dimensioned such that at least a portion of fluid leaving the indentation enters the adjacent vent passage without becoming part of the vortex, said side wall portions joining adjacent side walls of said fluid receiving passages at lines which are included in a plane containing the end face of said barrier, and passage means connecting said vent passages in communication with each other and in communication with a common vent passage.

19. In a fluid control device, first means for generating a jet of fluid, fluid receiving means downstream from said first means for receiving fluid from a jet generated by said first means, control means for controllably deflecting a jet generated by said first means relative to said receiving means, a pair of vent passages opening upstream from said receiving means at opposite sides of a jet generated by said first means for relieving fluid pressure in said receiving means, and passage means connecting said vent passages in communication with each other and receiving fluid vented through said vent passages.

20. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, a pair of vent passages opening upstream from said fluid receiving passages at opposite sides of a jet generated by said first means for relieving fluid pressure in said fluid receiving passages, each of said vent passages having a pair of side walls with the downstream side wall of each vent passage having a straight portion at its open end which extends upstream and away from the open end, the upstream side walls of said vent passages joining the side walls of said chamber at a pair of lines which are included in a first plane spaced upstream from and substantially parallel to the end face of said barrier, the upstream side wall of each vent passage having a straight portion at its open end which extends upstream and away from the open end and which forms an angle of approximately sixty degrees with said first plane, said straight portions of the downstream side walls of said vent passages joining the side walls of said fluid receiving passages at a pair of lines which are included in a second plane also containing the end face of said barrier, and passage means connecting said vent passages in communication with each other and in communication with a common vent passage.

21. In a fluid control device, first means including a nozzle having a preselected width dimension for generating a jet of fluid, a chamber downstream from the nozzle having side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, and a pair of vent passages opening upstream from said fluid receiving passages at opposite sides of a jet generated by said first means for relieving fluid pressure in said fluid receiving passages, each of said vent passages having a pair of side walls with the downstream side wall of each vent passage having a straight portion at its open end which extends upstream and away from the open end, said end face having an indentation for receiving fluid from an attached jet generated by said first means and creating a vortex of the received fluid flowing in a direction to maintain attachment of an attached jet, said indentation being dimensioned such that at least a portion of fluid leaving the indentation enters the adjacent vent passage without becoming part of the vortex, said straight portions of the downstream side walls of said vent passages joining the side walls of said fluid receiving passages at a pair of lines which are included in a first plane also containing the end face of said barrier, passage means connecting said vent passages in communication with each other and in communication with a common vent passage, means for adjustably restricting said common vent passage, said indentation having a rectangular configuration with a width dimension at least twice as great as said nozzle width dimension, and with a depth dimension at least as great as said nozzle width dimension, the upstream side walls of said vent passages having straight portions at their open ends which extend upstream and away from the open end, the upstream side walls of said vent passages joining the side walls of said chamber at a pair of lines included in a second plane which is spaced upstream from and substantially parallel to the end face of said barrier, the straight portions of said upstream side walls forming with said second plane angles of the order of sixty degrees.

22. In a fluid control device, first means for generating a jet of fluid, fluid receiving means downstream from said first means for receiving fluid of a jet generated by said first means, control means at a side of a jet of fluid generated by said first means for producing a control jet of fluid which by momentum exchange controllably deflects a jet of fluid generated by said first means relative to said receiving means, a pair of vent passages opening at opposite sides of a jet of fluid generated by said first means for relieving fluid pressure in said receiving means, and passage means connected to said vent passages to guide a component of fluid vented through either of said vent passages to the opposite side of and toward a jet of fluid generated by said first means for providing an auxiliary control of jet deflection.

23. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, a pair of spaced fluid receiving passages for receving fluid from a jet attached to a selected side wall, control means for controlling attachment of a jet generated by said first means to said side walls, a barrier intermediate said fluid receiving passages with an end face confronting said chamber, a pair of vent passages opening at opposite sides of a jet generated by said first means and adjacent the openings of said fluid receiving passages for relieving fluid pressure in said fluid receiving passages, each of said vent passages having a pair of side walls with the downstream side wall of each vent passage having a straight portion at its open end which extends upstream and away from the open end, and passage means connecting said vent passages in communication with each other and in communication with a common vent passage.

24. In a fluid control device, first means for generating a jet of fluid, a chamber adjacent the origin of a jet generated by said first means and defined by a pair of side walls, said side walls establishing boundary layer regions which effect attachment of a jet generated by said first means to a selected side wall when the jet is deflected toward the selected side wall, a pair of spaced fluid receiving passages for receiving fluid from a jet attached to a selected side wall, control means for controlling attachment of a jet generated by said first means to said side walls, a barrier intermediate said fluid receiving passages with an end face confronting said chamber, a pair of vent passages opening at opposite sides of a jet generated by said first means and adjacent the openings of said fluid receiving passages for relieving fluid pressure in said fluid receiving passages, each of said vent passages having a pair of side walls with the downstream side wall of each vent passage having a straight portion at its open end which extends upstream and away from the open end, said end face having an indentation for receiving a portion only of fluid from an attached jet generated by said first means and creating a vortex of a portion of the received fluid flowing in a direction to maintain attachment of an attached jet, said indentation being dimensioned such that a portion of fluid leaving the indentation enters the adjacent vent passage without becoming part of the vortex, and passage means connecting said vent passages in communication with each other and in communication with a common vent passage.

References Cited by the Examiner
UNITED STATES PATENTS

| | | | |
|---|---|---|---|
| 1,658,797 | 2/28 | Charette et al. | 230—92 |
| 2,984,218 | 5/61 | Christianson | 137—596.15 |
| 3,024,805 | 3/62 | Horton | 137—83 |

FOREIGN PATENTS

| | | |
|---|---|---|
| 1,278,781 | 11/61 | France. |
| 1,283,184 | 12/61 | France. |

LAVERNE D. GEIGER, *Primary Examiner.*